Aug. 8, 1961 W. B. TURNER 2,994,963
KEYWAY MEASURING INSTRUMENT
Filed Jan. 16, 1959
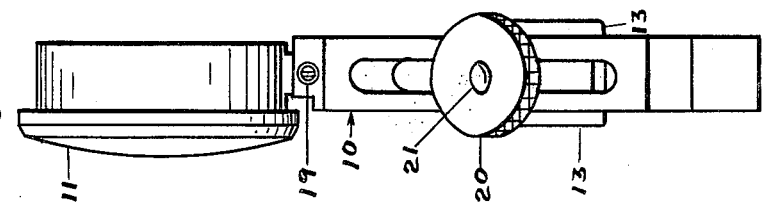
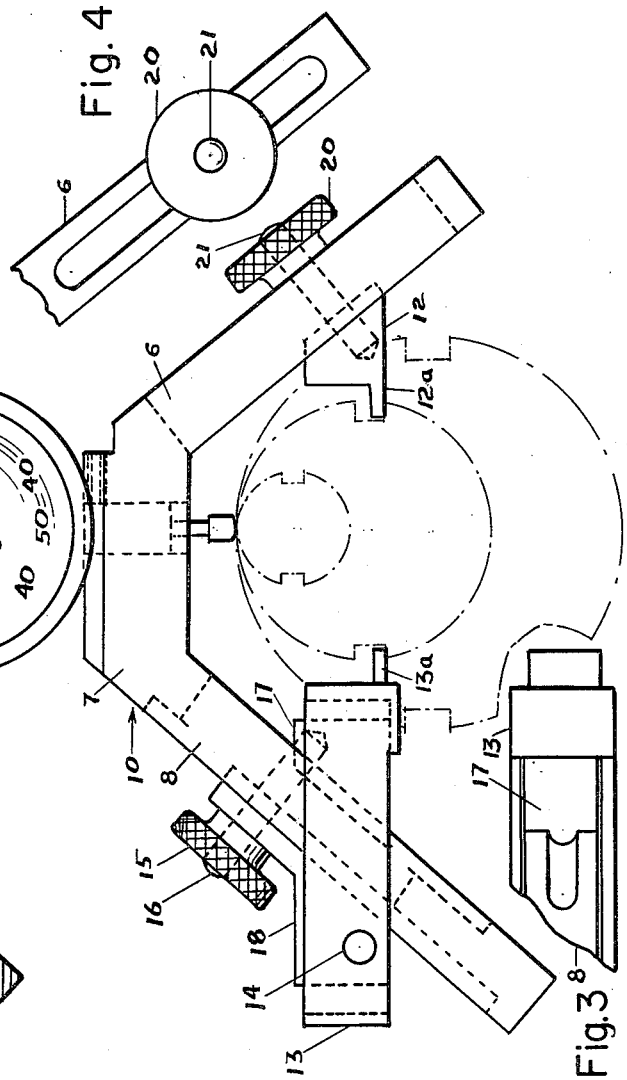
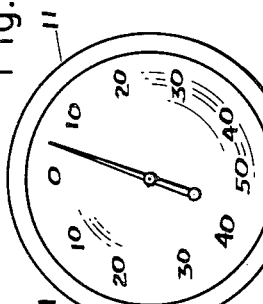
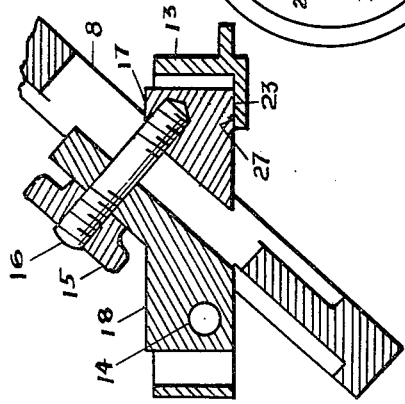
Wright B Turner

United States Patent Office 2,994,963
Patented Aug. 8, 1961

2,994,963
KEYWAY MEASURING INSTRUMENT
Wright B. Turner, 14 Hemlock Drive, Holden, Mass.
Filed Jan. 16, 1959, Ser. No. 787,199
3 Claims. (Cl. 33—178)

Ths invention relates to improvements in a measuring instrument, particularly for keyways.

The keyway measuring instrument has for its principal object, measuring how much off center a pair of external opposite keyways are with respect to the centerline of the shaft, upon which the keyways have been cut.

The invention is most useful in measuring off-center conditions in blind keyways in shafts such as round end keyways. In this connection, it is possible to cut undersize keyways in a machine, measure the off-center condition, correct the keyway making machine error, and then cut the keyways to size without removing the shaft from the keyway making machine.

Another advantage of the invention is that it also is a time saver when keyway conditions are to be measured on a shaft too heavy or too long to be set up on a surface plate, which is the conventional method of measuring centralness of opposite keyways.

These and various other objects and advantages of the invention will become apparent upon reading the following description.

In the drawing, FIG. 1 is a face view of the instrument, with the dot and dash lines representing the range of comparative sizes of keyways and shafts which can be measured, FIG. 2 is a sectional view of the pivot and shoe and shows in greater detail how the clamping arrangement works, FIG. 3 is a bottom view and shows the clearances between the shoe 13 and the frame 10 and the slide 17, FIG. 4 is a top angular view of the frame 10 showing the type of slot in which the sliding shoe 12 is clamped, and FIG. 5 is the end view showing the comparative proportions of the component parts of this invention.

The keyway measuring instrument is constructed in the embodiment illustrated with a frame 10 having a pair of angularly offset elongated legs 6 and 8 rigidly interconnected by an intermediate body portion 7, through which a suitable indicating means 11 such as a dial indicator or the like protrudes for engagement with the outer surface of a shaft which has in it a pair of opposed keyways to be measured. The leg 6 of frame 10 is slotted lengthwise to accommodate a stud 21 which cooperates with a binder knob 20 to secure the sliding shoe 12 in a fixed position on the leg 6. The leg 8 of frame 10 is slotted lengthwise to accommodate a stud 16 which cooperates with a binder knob 15 to secure the inner slide 17 and the outer slide 18 in a fixed position on leg 8. Pivot 14 extending through the outer slide 18 supports the pivoted shoe 13 for rotation about an axis parallel to the longitudinal axis or centerline of a shaft to be measured. The stop 27 projecting from the inner slide 17 engages the abutment 23 on the pivoted shoe 13 to limit rotation of the shoe 13 about pivot 14 toward the indicating means 11. The shoes 12 and 13 respectively include inwardly projecting portions 12a and 13a disposed so that they project into opposing keyways on a shaft to be measured for engagement with the sides of the respective keyways most remote from the indicating means.

The pivoted shoe 13 facilitates the application of this keyway measuring instrument to a shaft which has blind keyways. The portion 12a of shoe 12 may be inserted in one keyway with the abutment 23 of shoe 13 displaced from stop 27 on inner slide 17. Then the portion 13a of shoe 13 is inserted in the opposing keyway. Finally, the frame 10 is set down into the position illustrated in FIG. 1 in which the weight of the frame 10 brings the stop 27 into engagement with the abutment 23 to position the indicating means 11 in engagement with the surface of the shaft to be measured. Before this procedure is undertaken, it may be necessary to properly position the shoes 12 and 13 upon the respective legs 6 and 8 so that the distance between the ends of portions 12a and 13a closely approximates the distance between the bottoms of the keyways to be measured.

It will be seen from FIGS. 1 and 2 of the drawing that the outer slide 18 carrying pivot 14 and the inner slide 17 and shoe 12 are equipped with keys which slide in slots in the frame 10 and are also respectively equipped with binder knobs 15 and 20 and studs 16 and 21 which allow for adjustment for various sizes of shafts and keyways.

It will also be seen that the indicator 11 can be adjusted in a vertical direction for about three-eighths of an inch, and is held in the desired position by a clamping arrangement such as a set screw 19, allowing a further adjustment for size of shafts and keyways.

The dot and dash lines represent the range of sizes of shafts and keyways which may be measured with this instrument.

To use the invention, set the shoes 12 and 13 against the sides of the keyways to be measured most remote from the indicator, with the indicator touching the outside surface of the shaft, set the indicator pointer on zero, then remove the instrument and turn the shaft or the instrument 180 degrees relative to the other about the longitudinal axis or centerline of the shaft, set the shoes against the other sides of the keyways, then take the new indicator reading and divide by two. This gives the amount that the keyway cutter was off center from the shaft when the keyways were cut, and also how much off center from the longitudinal axis or centerline of the shaft the centerline of the keyways is.

While the foregoing description sets forth the invention in specific terms, it is to be understood that numerous changes in size, shape, bearings and materials may be resorted to without departing from the spirit and scope of the invention as claimed.

I claim:

1. An instrument comprising an elongated frame, indicating means mounted upon said frame intermediate the ends thereof and projecting therefrom into engagement with the surface of a shaft to be measured having diametrically opposed keyways therein, a first shoe secured to said frame adjacent one end thereof, positioned for engagement with one keyway of a shaft to be measured, a slide means secured to said frame adjacent the other end thereof, a second shoe pivotally mounted upon said slide means for rotation about an axis substantially parallel to the longitudinal axis of a shaft to be measured, and fixed stop means interposed between said slide means and said second shoe to limit rotation of said second shoe toward said indicating means, as said second shoe is positioned in engagement with the other keyway of a shaft to be measured.

2. An instrument for accurately measuring the placement of diametrically opposed keyways on a shaft, comprising a generally planar frame including first and second elongated angularly offset legs and an intermediate body portion rigidly interconnecting said first and second legs, indicating means mounted upon said intermediate body portion and projecting therefrom between said legs for engagement with the surface of a shaft to be measured, a first shoe adjustably fixedly secured to said first leg of said frame, a first projecting portion extending from said first shoe for engagement with one keyway of a shaft to be measured, a slide means adjustably fixedly secured to said second leg of said frame, a second shoe pivotally mounted upon said slide means for rotation about an axis perpendicular to the plane of said frame, a second projecting portion extending from said second shoe for engagement with the other keyway of a shaft to be measured, and fixed stop means on said slide means arranged to engage said second shoe to limit rotation of said second shoe toward said indicating means.

3. An instrument for accurately measuring the placement of diametrically opposed keyways on a shaft, comprising a generally planar frame including first and second elongated angularly offset legs and an intermediate body portion rigidly interconnecting said first and second legs, indicating means mounted upon said intermediate body portion and projecting therefrom between said legs for engagement with the surface of a shaft to be measured, a first keyway engaging shoe adjustably fixedly secured to and projecting from said first leg of said frame, a slide means adjustably fixedly secured to said second leg of said frame, a second keyway engaging shoe pivotally mounted upon said slide means for rotation about an axis perpendicular to the plane of said frame and projecting from said second leg, and fixed stop means on said slide means arranged to engage said second shoe to limit rotation of said second shoe toward said indicating means.

References Cited in the file of this patent

UNITED STATES PATENTS

| | | |
|---|---|---|
| 1,635,908 | Stuart | July 12, 1927 |
| 2,321,888 | Baracskai | June 15, 1943 |
| 2,603,043 | Bontemps | July 15, 1952 |